(12) United States Patent
Fricke

(10) Patent No.: US 10,371,601 B2
(45) Date of Patent: Aug. 6, 2019

(54) METHODS AND SYSTEMS FOR TESTING COUPLED HYBRID DYNAMIC SYSTEMS

(71) Applicant: MTS Systems Corporation, Eden Prairie, MN (US)

(72) Inventor: David M. Fricke, Prior Lake, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 497 days.

(21) Appl. No.: 14/481,680

(22) Filed: Sep. 9, 2014

(65) Prior Publication Data

US 2015/0134291 A1 May 14, 2015

Related U.S. Application Data

(60) Provisional application No. 61/875,615, filed on Sep. 9, 2013.

(51) Int. Cl.
*G01M 17/00* (2006.01)
*G01M 17/007* (2006.01)

(52) U.S. Cl.
CPC ........ *G01M 17/0074* (2013.01); *G01M 17/00* (2013.01); *G01M 17/007* (2013.01)

(58) Field of Classification Search
CPC .......................... G01M 17/00; G01M 17/007; G01M 17/0074
(Continued)

(56) References Cited

U.S. PATENT DOCUMENTS 3,592,545 A 7/1971 Paine et al.
3,597,967 A 8/1971 Drexler et al.
(Continued)

FOREIGN PATENT DOCUMENTS

CN 102129487 A 7/2011
CN 102227622 A 10/2011
(Continued)

OTHER PUBLICATIONS

International Search Report and Written Opinion for corresponding International application No. PCT/US2014/054797, dated Jan. 16, 2015.
(Continued)

*Primary Examiner* — Sujoy K Kundu
*Assistant Examiner* — Lynda Dinh
(74) *Attorney, Agent, or Firm* — Steven M. Koehler; Westman, Champlin & Koehler, P.A.

(57) ABSTRACT

A test system and method for testing a coupled hybrid dynamic system in simulated motion along a path (242) includes a physical test rig (206) configured to test a physical component (208). A processor (30) is configured with modeled test data (218), a first virtual model portion and a second virtual model portion of the coupled hybrid dynamic system, the first virtual model portion (204), the second virtual model (202) portion and the physical component (80) comprising the coupled hybrid dynamic system. The processor (30) is configured to control the test rig (206) such that the component under test (208) responds to the second virtual model portion (202), that in turn receives a first input (272) comprising the modeled test data (218), a second input (216) being motion of the first virtual model portion (204) of the coupled hybrid dynamic system, a third input (214) being a control mode response from the test rig having (206) the physical component (208) under test and a fourth input (272) comprising guidance controls for the coupled hybrid dynamic system.

6 Claims, 8 Drawing Sheets

(58) Field of Classification Search
USPC .................................................. 702/113
See application file for complete search history.

(56) References Cited

U.S. PATENT DOCUMENTS

| | | | |
|---|---|---|---|
| 3,818,751 A | 6/1974 | Karper et al. | |
| 3,939,692 A | 2/1976 | Bollinger | |
| 4,882,677 A | 11/1989 | Curran | |
| 4,916,632 A | 4/1990 | Doi | |
| 5,014,719 A | 5/1991 | McLeod | |
| 5,038,605 A | 8/1991 | Tews | |
| 5,101,660 A | 4/1992 | La Belle | |
| 5,168,750 A | 12/1992 | Kurtz | |
| 5,259,249 A | 11/1993 | Fetto | |
| 5,277,584 A | 1/1994 | DeGroat | |
| 5,369,974 A | 12/1994 | Tsymberov | |
| 5,450,321 A | 1/1995 | Crane | |
| 5,430,645 A | 7/1995 | Keller | |
| 5,487,301 A | 1/1996 | Ueller et al. | |
| 5,511,431 A | 4/1996 | Hinton | |
| 5,541,504 A | 7/1996 | Kubo et al. | |
| 5,598,076 A | 1/1997 | Neubauer | |
| 5,602,759 A | 2/1997 | Harashima | |
| 5,821,718 A | 10/1998 | Shaffer | |
| 5,877,414 A | 3/1999 | Rui | |
| 5,880,362 A | 3/1999 | Tang | |
| 5,936,858 A | 8/1999 | Arai | |
| 5,937,530 A | 8/1999 | Masson | |
| 5,942,673 A | 8/1999 | Horiuchi | |
| 5,952,582 A | 9/1999 | Akita | |
| 5,959,215 A | 9/1999 | Ono et al. | |
| 5,999,168 A | 12/1999 | Rosenberg | |
| 6,044,696 A | 4/2000 | Spencer-Smith | |
| 6,105,422 A | 8/2000 | Pollock | |
| 6,134,957 A | 10/2000 | Fricke et al. | |
| 6,141,620 A | 10/2000 | Zyburt | |
| 6,171,812 B1 | 1/2001 | Smith | |
| 6,192,745 B1 | 2/2001 | Tang | |
| 6,234,011 B1 | 5/2001 | Yamagishi | |
| 6,247,348 B1 | 6/2001 | Yamakado et al. | |
| 6,285,972 B1 | 9/2001 | Barber | |
| 6,418,392 B1 | 7/2002 | Rust et al. | |
| 6,502,837 B1 | 1/2003 | Hamilton et al. | |
| 6,510,740 B1 | 1/2003 | Behm et al. | |
| 6,538,215 B2 | 3/2003 | Montagnino et al. | |
| 6,571,373 B1 | 5/2003 | Devins et al. | |
| 6,577,973 B1 | 6/2003 | Freitag | |
| 6,581,437 B2 | 6/2003 | Chrystall et al. | |
| 6,634,218 B1 | 10/2003 | Nakanishi et al. | |
| 6,715,336 B1 | 4/2004 | Xu | |
| 6,721,922 B1 | 4/2004 | Walters et al. | |
| 6,725,168 B2 | 4/2004 | Shirasi et al. | |
| 6,754,615 B1 | 6/2004 | Germann et al. | |
| 6,898,542 B2 | 5/2005 | Ott et al. | |
| 6,962,074 B2 | 11/2005 | Lenzen et al. | |
| 7,031,949 B2 | 4/2006 | Lund | |
| 7,058,488 B2 | 6/2006 | Kemp et al. | |
| 7,104,122 B2 | 9/2006 | Kurai et al. | |
| 7,117,137 B1 | 10/2006 | Belcea | |
| 7,146,859 B2 | 12/2006 | Dittmann et al. | |
| 7,194,888 B1 | 3/2007 | Temkin et al. | |
| 7,257,522 B2 | 8/2007 | Hagiwara et al. | |
| 7,363,805 B2 | 4/2008 | Jayakumar et al. | |
| 7,383,738 B2 | 6/2008 | Schulz | |
| 7,441,465 B2 | 10/2008 | Oliver et al. | |
| 8,135,556 B2 | 3/2012 | Fricke | |
| 8,825,460 B2 | 9/2014 | Walenta | |
| 9,009,013 B2 | 4/2015 | Krainz | |
| 2001/0045941 A1 | 11/2001 | Rosenberg et al. | |
| 2002/0029610 A1 | 3/2002 | Chrystall et al. | |
| 2002/0134169 A1 | 9/2002 | Takeda et al. | |
| 2002/0170361 A1 | 11/2002 | Vilendrer et al. | |
| 2003/0029247 A1 | 2/2003 | Biedermann et al. | |
| 2003/0033058 A1 | 2/2003 | Lund | |
| 2003/0183023 A1 | 10/2003 | Kusters | |
| 2004/0019382 A1 | 1/2004 | Amirouche et al. | |
| 2004/0019384 A1 | 1/2004 | Kirking et al. | |
| 2004/0107082 A1 | 6/2004 | Sato et al. | |
| 2004/0255661 A1 | 12/2004 | Nagai et al. | |
| 2005/0027494 A1 | 2/2005 | Erdogmus | |
| 2005/0050950 A1 | 3/2005 | Anderson | |
| 2005/0120783 A1 | 6/2005 | Namoun | |
| 2005/0120802 A1 | 6/2005 | Schulz | |
| 2006/0005616 A1 | 1/2006 | Bochkor et al. | |
| 2006/0028005 A1 | 2/2006 | Dell Eva et al. | |
| 2006/0059993 A1 | 3/2006 | Temkin et al. | |
| 2006/0069962 A1 | 3/2006 | Dittmann | |
| 2007/0256484 A1 | 11/2007 | Imanishi et al. | |
| 2007/0260372 A1 | 11/2007 | Langer | |
| 2007/0260373 A1* | 11/2007 | Langer | G01M 17/007 701/31.4 |
| 2007/0260438 A1 | 11/2007 | Langer et al. | |
| 2007/0275355 A1 | 11/2007 | Langer et al. | |
| 2008/0271542 A1 | 11/2008 | Schulz | |
| 2008/0275681 A1 | 11/2008 | Langer | |
| 2008/0275682 A1 | 11/2008 | Langer | |
| 2009/0012763 A1 | 1/2009 | Langer et al. | |
| 2010/0088058 A1* | 4/2010 | Fricke | G01M 17/0074 702/113 |
| 2011/0224959 A1 | 9/2011 | Zhang et al. | |
| 2013/0030751 A1 | 1/2013 | Fricke | |
| 2013/0304441 A1 | 11/2013 | Fricke | |
| 2014/0107962 A1 | 4/2014 | Fricke | |
| 2015/0134291 A1 | 5/2015 | Fricke | |

FOREIGN PATENT DOCUMENTS

| | | |
|---|---|---|
| DE | 2728007 B1 | 8/1978 |
| DE | 4411508 A1 | 10/1995 |
| EP | 0890918 A2 | 1/1999 |
| EP | 0919201 A1 | 6/1999 |
| EP | 1396802 A2 | 3/2004 |
| EP | 1422508 A1 | 5/2004 |
| GB | 2494712 A | 3/2013 |
| JP | H06187030 A | 7/1994 |
| JP | H1020930 A | 1/1998 |
| JP | 2000289417 A | 10/2000 |
| JP | 2009536736 A | 10/2009 |
| JP | 2010-223677 A | 10/2010 |
| JP | 2012504765 A | 2/2012 |
| WO | 9312475 A1 | 6/1993 |
| WO | 0023934 A1 | 4/2000 |
| WO | 2007133600 A2 | 11/2007 |
| WO | 2010039777 A1 | 4/2010 |

OTHER PUBLICATIONS

International Search Report and Written Opinion for corresponding International application No. PCT/2014/054789, dated Jan. 12, 2015.
D.W. Clark: "Adaptive control of a materiais-testing machine," 1996, The Institution of Electrical Engineers, pp. 4/1-4/4.
The 858 Mini Bionix II Test System Brochure; mts.com/downloads/300213.01.pdf; pub. 1999.
International Search Report and Written Opinion from the European Patent Office dated Aug. 1, 2014 for corresponding International application No. PCT/US2014/024273, filed Mar. 12, 2014.
Communication from the European Patent Office for European patent application No. 14771483.6, dated Jun. 26, 2017.
Communication from the European Patent Office for European patent application No. 14766646.5, dated Jun. 13, 2017.
Chinese Office Action for Chinese Patent Application No. 201480058303.7, dated Jan. 3, 2018.
Chinese Office Action dated Nov. 13, 2017 for corresponding Chinese Patent Application No. 201480057882.3, filed Sep. 9, 2014.
Japanese Office Action, dated May 22, 2018, for corresponding Japanese Patent Application No. 2016-540924, filed Sep. 23, 2016.
Japanese Office Action with English translation for Japanese Patent Application No. 2016-540925, dated Aug. 24, 2018.
Notice of Final Rejection for Japanese Patent Application No. 2016-540925, dated Apr. 24, 2019, with English translation.

(56) References Cited

OTHER PUBLICATIONS

Written Decision to reject European Patent Application No. 14766646.5, dated Apr. 23, 2019.

* cited by examiner

METHODS AND SYSTEMS FOR TESTING COUPLED HYBRID DYNAMIC SYSTEMS

CROSS-REFERENCE TO RELATED APPLICATIONS

This application claims the benefit of U.S. Provisional Patent Application Ser. No. 61/875,615 filed Sep. 9, 2013.

BACKGROUND

The discussion below is merely provided for general background information and is not intended to be used as an aid in determining the scope of the claimed subject matter.

The present invention is related to U.S. Pat. No. 8,135,556 and U.S. Published Patent Application US 2013/030444A1, which are hereby incorporated by reference in its entirety. Generally, the afore-mentioned application provides an arrangement for controlling simulation of a coupled hybrid dynamic system. The arrangement comprises a physical test rig configured to drive a physical structural component of the system and to generate a test rig response as a result of applying a drive signal input to the test rig. A processor is configured with a virtual model of the complementary system (herein also "virtual model") to the physical component (i.e. the virtual model of the complementary system and the physical component comprises the complete hybrid dynamic system). The processor receives a first part of a test rig response as an input and generates a model response of the complementary system using the first part of the received test rig response and a virtual drive as inputs. The processor is further configured to compare a different, second part of the test rig response with the corresponding response from virtual model of the complementary system to form a difference, the difference being used to form a system dynamic response model which will be used to generate the test rig drive signal.

In an embodiment, the processor is further configured to generate the test drive signal, receive the test rig response, generate a response from the virtual model of the complementary system, and compare the test rig response with the response from the virtual model of the complementary system to generate a hybrid simulation process error. The error is then reduced using an inverse of the system dynamic response model, in an iterative fashion until the difference between the response from the virtual model of the complementary system and the test rig response is below a defined threshold.

In one embodiment illustrated in FIGS. 11 and 12 of U.S. Published Patent Application US 2013/0304441A1, which is illustrated herein as FIGS. 1 and 2 with the same reference numbers although the schematic figures are of a different form, a random test rig drive 78' is played into a test rig 72' that has a vehicle 80' installed thereon. The test rig 72' applies loads and/or displacements to each spindle of the vehicle 80'. The random test rig drive 78' may be a generic drive, such as a random amplitude, broadband frequency drive, provided to a rig controller 74' that in turn controls actuators of the test rig 72'. Multiple responses 82', for instance six degrees of freedom (6 DOF) are obtained from suitable sensors for each spindle and are applied to a virtual model 70' of the complementary system, in this embodiment, comprising a virtual tire and wheel assembly for each spindle (disembodied tire and wheel, herein also "DWT"). For instance, and without limitation, the multiple responses 82' can comprise at each spindle, a vertical force, a longitudinal displacement, a lateral displacement, a camber angle and a steer angle. Other responses 84' from the test rig 72' are compared with responses 88' from the virtual model 70' of the complementary system. Again, for instance, and without limitation, the responses 88' can comprise a vertical displacement, a longitudinal force, a lateral force, a camber moment and a steer moment. It is to be noted that the force and displacement signals are exemplary only, as other response signals may be provided from the test rig 72'.

The responses 82' from the test rig 72' are supplied as inputs to form a random drive 86' to the virtual model 70' of the tire and wheel assemblies. The virtual vehicle model 70' excludes the components under test, in this case the vehicle 80' less the wheels and tires. The virtual model 70' responds to the random drive input signals 86' with random response signals 88'.

In the third step of the process, the random responses 88' of the virtual model 70' of the tires and wheels are compared to the associated test rig random responses 84'. A comparison 90' is performed to form random response differences 92' (herein comprising forces, moments and displacements). The relationship between the random response differences 92' and the random rig drives 78' establishes the system dynamic response model 76'. The determination of the combined system dynamic response model 76' may be done in an off-line process, such that high powered and high speed computing capabilities are not required. The off-line measurement of the system dynamic response model 76' measures the sensitivity of the difference in the responses 88' of the virtual model 70' of the tires and wheels and rig responses 84' to the rig inputs when the vehicle 80' is in the physical system. Further, since there is no need to acquire data, any component can be tested without previous knowledge of how that component is going to respond within a virtual model, or in a physical environment. The off-line measurement of the system dynamic response model 76' measures the sensitivity of the difference in response 88' of the virtual model of the complementary system and rig response 84' to the rig inputs when the component 80' is in the physical system. Once the relationship between rig drive 78' and system response difference 92' has been modeled, an off-line iteration process is performed, as seen in FIG. 2. This may be considered as the test drive development step.

In the iterative process of FIG. 2, which is an off-line iteration, the virtual model 70' of the DWT is used. The virtual DWT are driven over a virtual test road 79', to generate response 88'. An additional input to the virtual model 70 of the complementary system, in addition to the virtual test road input 79' and/or power train and steering 83' (driver inputs), is shown as reference numeral 86'. The additional model input 86' to the model 70' is based on the test rig response 82' from the test rig 72' as well the inputs of DWT guidance 85'. The additional model input 86' is applied simultaneously to the vehicle model 70 during testing. For an initial iteration (N=0), the input 86' to the virtual model 70 of the complementary system will typically be at zero.

The response 88' of the virtual model 70' is compared to the test rig response 84' from the test rig 72'. This test rig response 84' is of the same forces and/or displacements as the response 88' so a comparison can be made by comparator 90' with the response difference indicated at 92'.

The response difference 92' is compared to a desired difference 104' by comparator 106'. Typically, the desired difference 104' will be set at zero for an iterative control process, although other desired differences may be employed.

The comparison between the response difference 92' and the desired difference 104' produces a simulation error 107' used by the inverse (FRF−1) 77' of the system dynamic response model 76' that was previously determined in the steps shown in FIG. 1. A drive correction 109' is added to the previous test rig drive signal 110' at 112' to generate the next test rig drive signal 78'.

The next test rig drive signal 78' is applied to the test rig 72' and first and second responses 82', 84' are measured. The response 82' to be applied to the DWT model 70' and generates via the processor and the virtual DWT model 70' response 88' that is compared to test rig response 84' so as to generate another simulation error 107'. The process applying corrected drives 78' and generating simulation errors 107' is repeated iteratively until the resulting simulation error 107' is reduced to a desired tolerance value.

Following the determination of the final test rig drive signal 78', the final test rig drive signal 78' is used in testing of the test component 80'. The test rig drive signal 78' is an input to the test rig controller 74' that drives the rig 72'. As indicated above besides the response 82', the DWT model 70' also receives as inputs the digital road data 79', power train & steer inputs to the DWT indicated at 83' and/or DWT guidance 85'. Hence, performance testing, durability testing and other types of testing may be performed on the physical component 80', herein a vehicle, without the need for a physical tires and wheels to have been previously measured and tested, or in fact, to even exist.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects of the invention include a test system and a method for testing a coupled hybrid dynamic system. The test system includes a physical test rig configured to test a physical component and a non-transitory computer storage device storing modeled test data, a first virtual model portion of the coupled hybrid dynamic system and a second virtual model portion of the coupled hybrid dynamic system, the first virtual model portion, the second virtual model portion and the physical component comprising the coupled hybrid dynamic system. A processor is operable with the storage device and configured to execute instructions comprising a method for operating the physical test rig such that the physical component under test responds to the second virtual model portion of the system, that in turn receives a first input comprising the modeled test data, a second input being a response of the first virtual model portion and a third input being a control mode response from the test rig having the physical component under test.

One or more of the following features can be present in other further embodiments.

The instructions can comprise the first virtual model portion responding to a response from the test rig having the physical structural component.

The response (e.g. coupling forces) from the test rig having the physical structural component cam correspond to a plurality of defined attachment points between the physical structural component and the first virtual model portion.

The response of the first virtual model portion can comprise motion, where for example, the coupled hybrid dynamic system comprises a body (e.g. a vehicle with the first virtual model portion being a vehicle body) moving along a path (e.g. the modeled test data comprises road). Guidance control inputs for the second virtual model portion can be provided such as guidance control inputs that correspond to a driver of the vehicle.

Further aspects of the present invention include a test system and method for testing a coupled hybrid dynamic system in simulated motion along a path includes a physical test rig configured to test a physical component. A processor is configured with modeled test data, a first virtual model portion and a second virtual model portion of the coupled hybrid dynamic system, the first virtual model portion, the second virtual model portion and the physical component comprising the coupled hybrid dynamic system. The processor is configured to control the test rig according to a method such that the component under test responds to the second virtual model portion, that in turn receives a first input comprising the modeled test data, a second input being motion of the first virtual model portion of the coupled hybrid dynamic system, a third input being a control mode response from the test rig having the physical component under test and a fourth input comprising guidance controls for the coupled hybrid dynamic system.

One or more of the following features can be present in other further embodiments.

The first virtual model portion of the coupled hybrid dynamic system can respond to a response from the test rig having the physical structural component. In addition, the response (e.g. coupling forces) from the test rig having the physical structural component can correspond to a plurality of defined attachment points between the physical structural component and the first virtual model portion of the coupled hybrid dynamic system.

The coupled hybrid dynamic system can comprise a vehicle (for example with the first virtual model portion being a vehicle body) and the guidance controls can correspond to a driver of the vehicle, while the modeled test data can comprise a road upon which the vehicle travels.

Yet another aspect of the present invention is a test system for testing a coupled hybrid dynamic system in simulated motion along a path. The test system includes a physical test rig configured to test a physical component and a processor configured with a first virtual model portion of the coupled hybrid dynamic system and a second virtual model portion of the coupled hybrid dynamic system, the first virtual model portion, the second virtual model portion and the physical component comprising the coupled hybrid dynamic system wherein a plurality of attachment points define connection between the physical structural component and the first virtual model portion of the coupled hybrid dynamic system. The processor is configured with virtual guidance control for the first virtual model portion. The processor is also configured such that a drive for the physical test rig that corresponds to the first virtual model portion, the second virtual model portion and the physical component moving together along the path is obtained by iteratively applying drives until virtual guidance control for the first virtual model portion is at least negligible when inputs into the first virtual model corresponding to the attachment points from a response of the physical test rig to a drive cause the first virtual model portion to move with the second virtual model portion along the path.

In one embodiment, the drives can be based on guidance inputs for the second virtual model portion, the second virtual model portion further responding to motion of the first virtual model portion and a response from the physical test rig.

In a further embodiment, the guidance inputs for the second virtual model portion can be iteratively corrected, and in yet a further embodiment, the inputs into the first virtual model corresponding to the attachment points can comprise forces.

The foregoing is particularly useful when the coupled hybrid dynamic system comprises a vehicle and the first virtual model portion comprises a body of the vehicle.

It should be noted that although described with a single virtual body responding to the test rig when driven, this should not be considered limiting in that other coupled hybrid dynamic systems may have more than one virtual body responding to responses obtained from the physical component(s), other virtual bodies and/or other inputs from the system. By way of example, another virtual body may respond to the same and/or other physical components, such as other physical components of the vehicle. For instance in another embodiment, actual engine mounts could also need to be tested along with struts. In that case, another portion (i.e. the engine) of the vehicle can be modeled in addition to the vehicle body. And/or in another embodiment, the system can have a model of a virtual body of a driver that interacts with the virtual vehicle body. And/or in yet another embodiment, the virtual vehicle body could also receive other modeled inputs (similar to modeled road) such as the how the wind can apply different loads, for example, when the vehicle is experiencing crosswinds.

DETAILED DESCRIPTION OF THE ILLUSTRATIVE EMBODIMENTS

Figure 1:
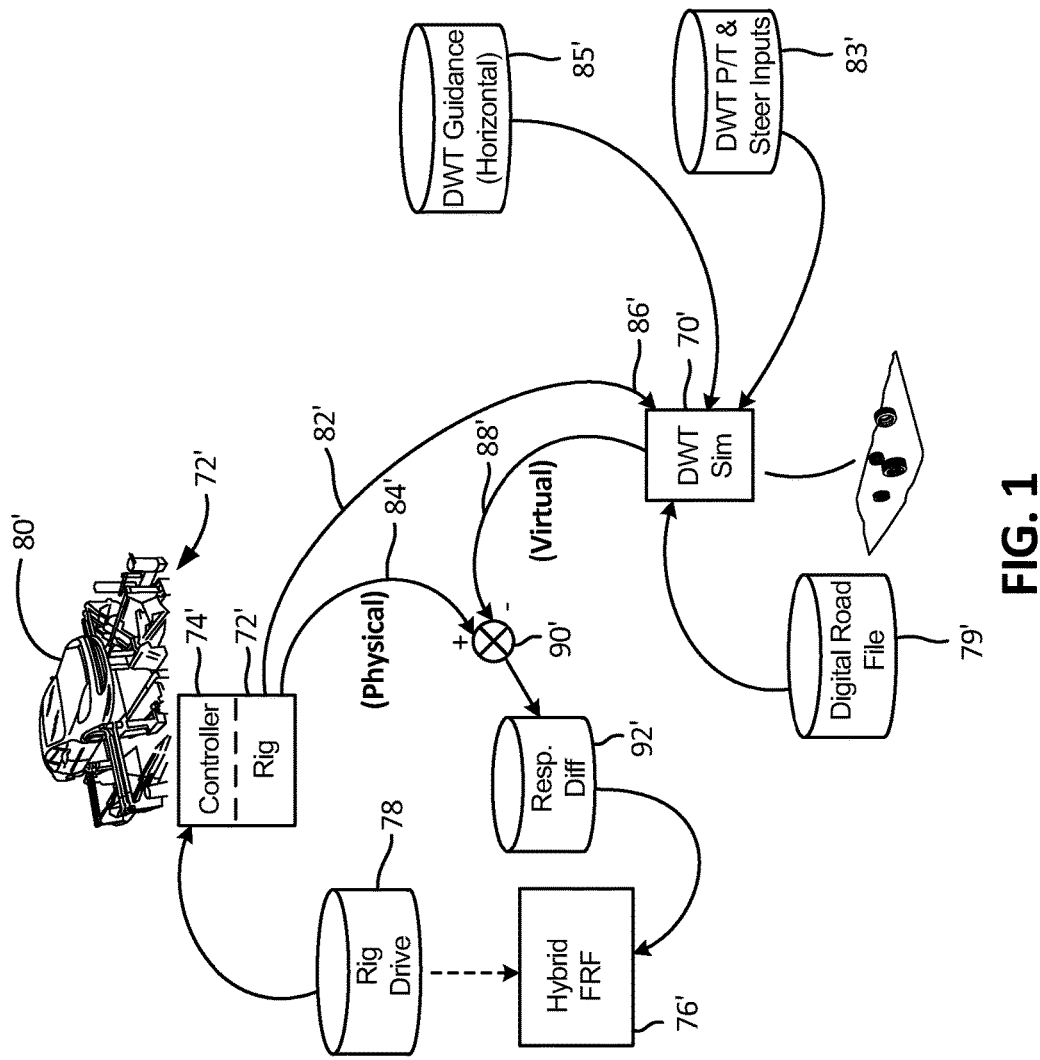
FIG. 1 is a schematic block diagram for controlling the simulation for a coupled hybrid dynamic system having a single virtual model.
Figure 2:
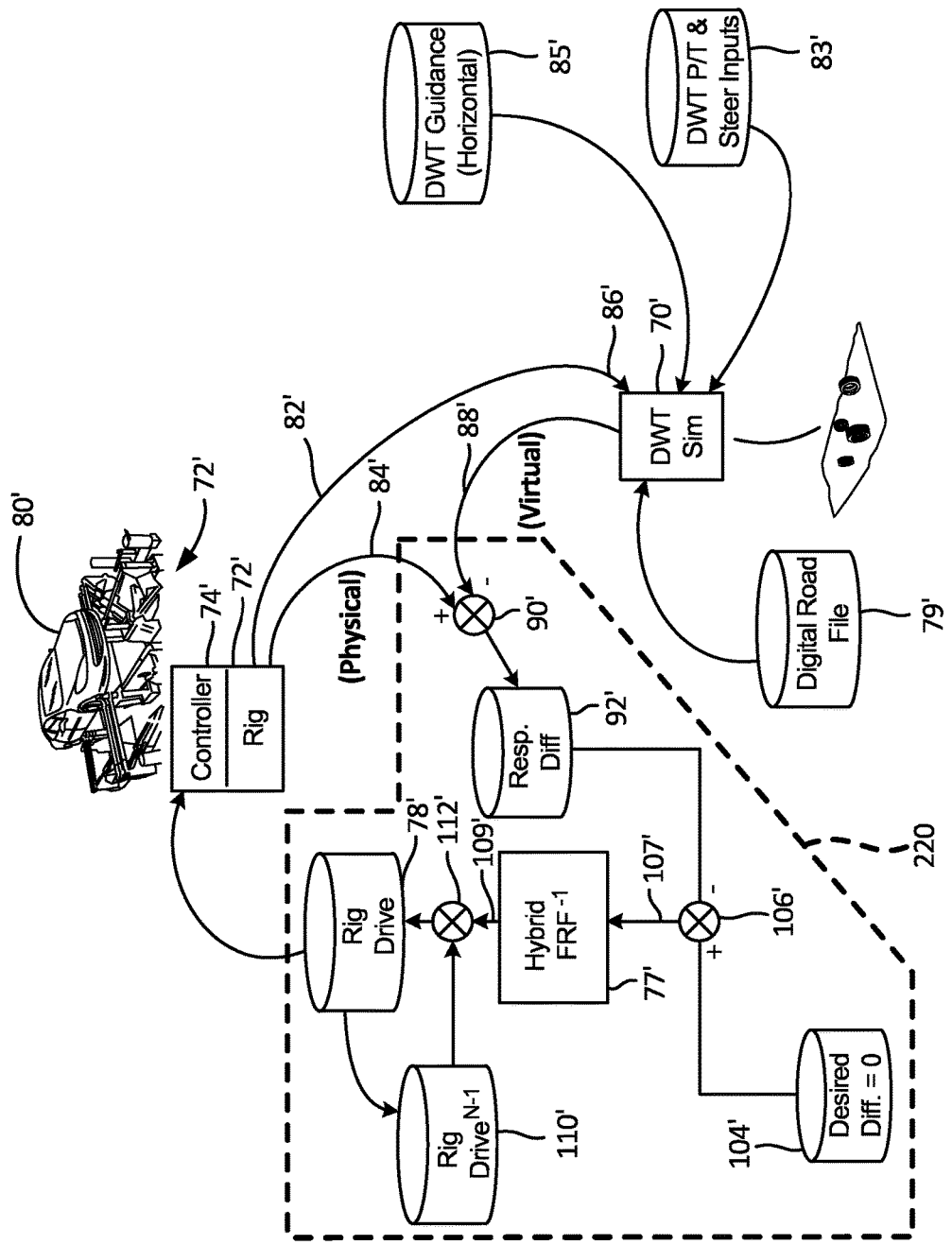
FIG. 2 is a schematic block diagram of an off-line iteration process for obtaining an initial drive for the coupled hybrid dynamic system of FIG. 1.
Figure 3:
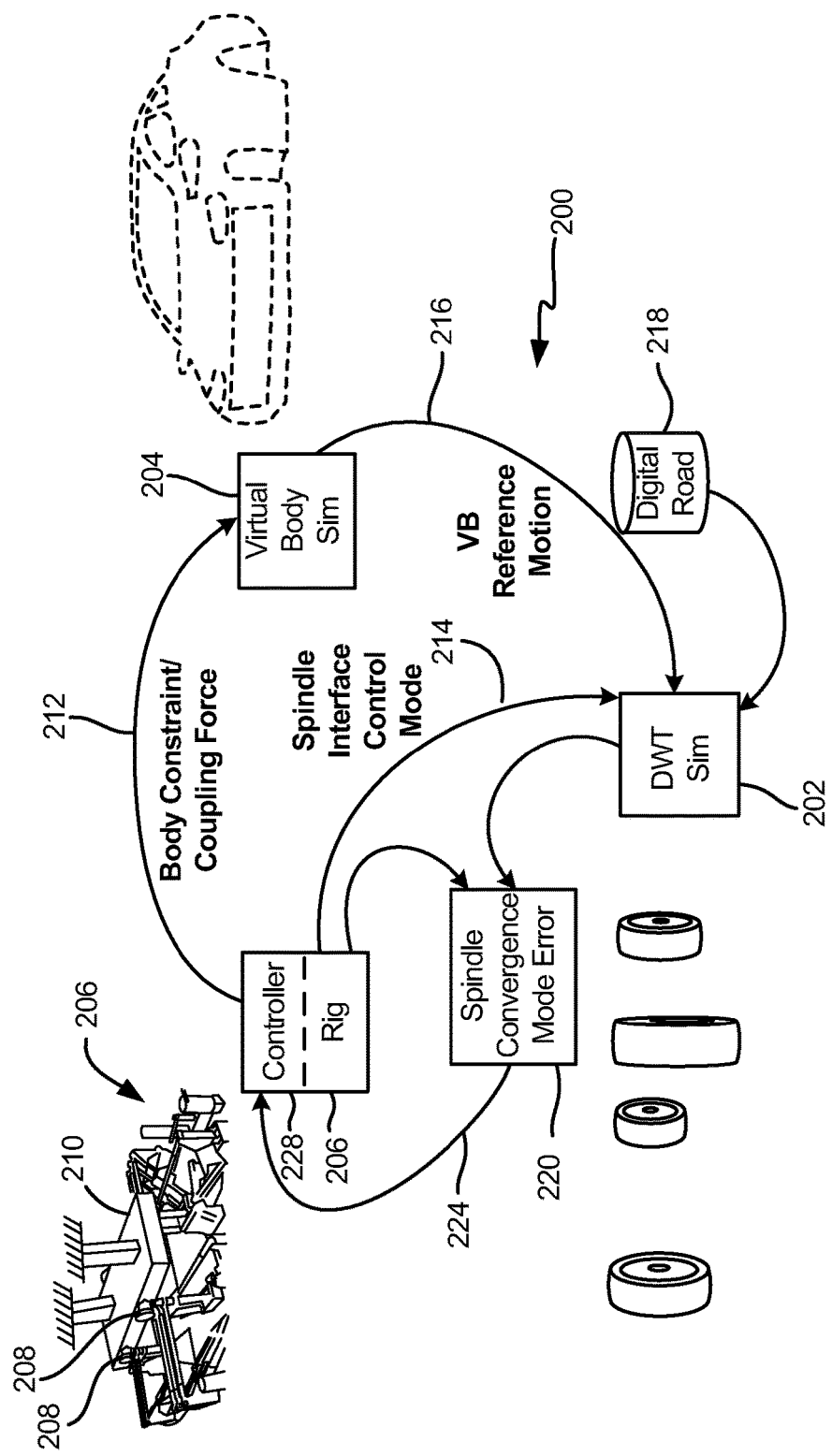
FIG. 3 is a schematic block diagram for controlling the simulation for a coupled hybrid dynamic system having two virtual model portions.

The above-described embodiment included an actual vehicle body 80' being coupled to a test rig 72' via the actual suspension components (struts, springs, shocks, spindles, etc.) of the vehicle 80' wherein a virtual model 70' was provided for the disembodied wheels and tires (DWT). In other words in the embodiment of FIGS. 1 and 2 the system included an actual vehicle body 80' that is free to respond to the force and/or displacement inputs provided by the rig 72'. In contrast, FIG. 3 illustrates an embodiment of the present invention comprising a system 200 having a plurality of virtual models 202 (collectively representing each virtual DWT, herein four virtual DWTs in total), 204 operably coupled together by physical components under test.

Although concepts herein described can be applied to other forms of hybrid systems, aspects of the present invention are particularly useful in vehicle component testing, herein by way of example only, the vehicle being an automobile or the like. In the illustrative embodiment, generally, the system 200 generally includes a virtual DWT model 202, a virtual vehicle body model 204 and a rig 206 with actuators to impart load and/or displacements upon actual physical suspension components (struts, springs, shocks, spindles, etc.), two of which are illustrated at 208. The rig 206 further includes a fixed reaction structure 210 to which the actual physical suspension components 208 are mounted. Load cells and/or displacement sensors operably coupled to the actual physical suspension components 208 provide responses 212 that serve as inputs to the virtual body model 204, while responses 214 (similar to responses 82' in FIGS. 1 and 2) are provided as inputs (control mode) to virtual DWT model 202. Typically, responses 212 comprise coupling forces at the body constraints to virtual body model 204 that in turn provides a virtual body reference motion or displacement 216 that is also provided as an input to the virtual DWT model 202. An input from a digital road file 218 and/or DWT power train & steering inputs 272 (FIG. 4) is/are also provided as input(s) to the virtual DWT model 202. The digital road file 218 can comprise a path defined in 1 to 3 dimensions, and can comprise one or more different types of roads (e.g. cobblestone, asphalt, etc.) with other optional features such as but not limited to potholes, curbs, etc. alone or in combination. Spindle convergence mode error block 220 represents the components identified within dashed area 220 of FIG. 2. The system dynamic response model of which can be obtained in a manner similar to that described above with respect to FIG. 1, where a final drive 224 for a controller 228 of the rig 206 is iteratively obtained in a manner similar to FIG. 2 using an inverse ($FRF^{-1}$) of the system dynamic response model. However, and importantly, the final rig drive 224 must also be appropriate such that the virtual body of the vehicle properly tracks the disembodied tire and wheel assemblies, which is explained below. Stated another way, the virtual body represented by model 204 is a virtual inertial element that must appear to track with the other virtual elements (each virtual DWT represented collectively by model 202) by properly responding to the responses 212 obtained from the physical components under test.

Figure 4:
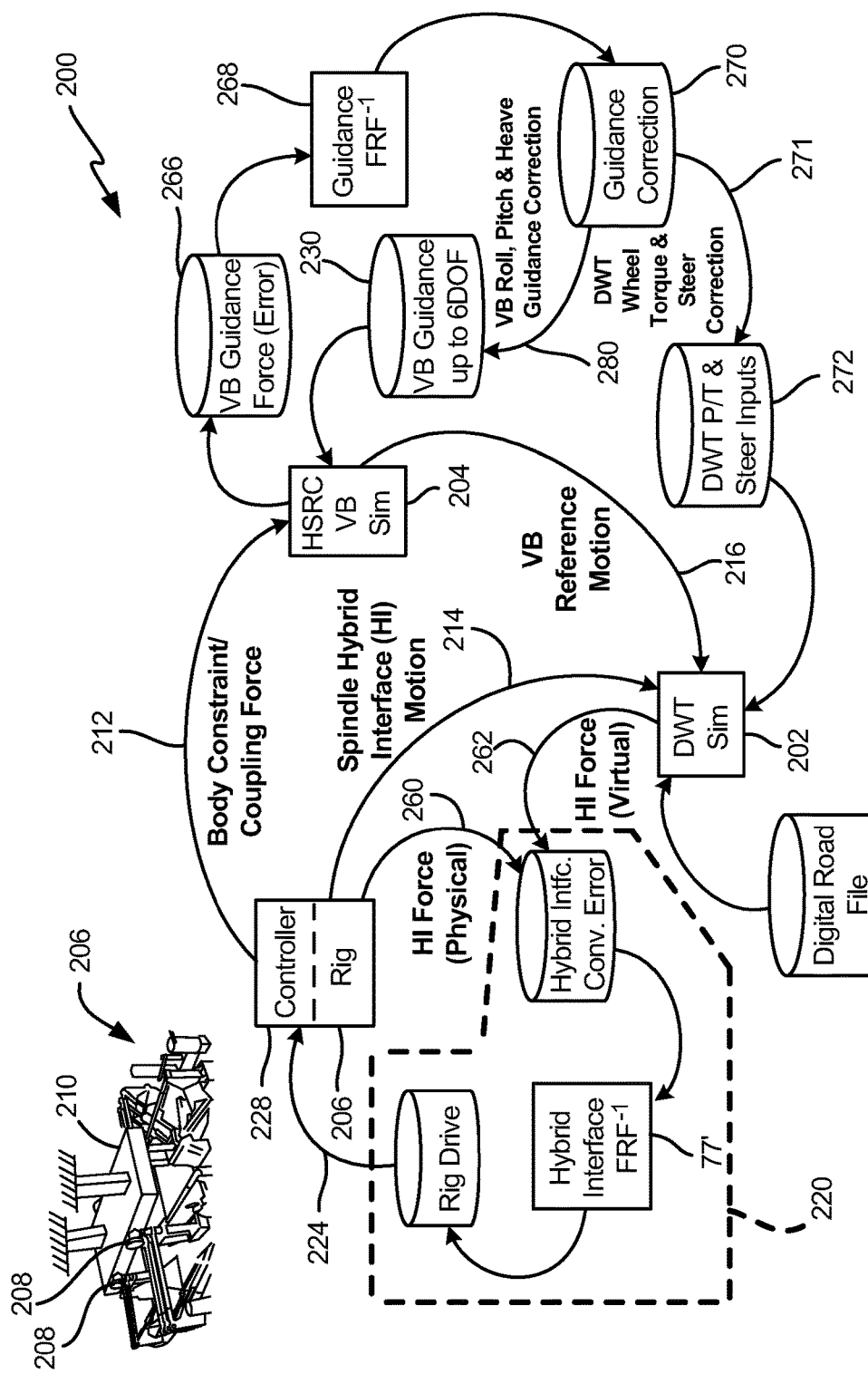
FIG. 4 is a schematic block diagram of an off-line iteration process for obtaining an initial drive for the coupled hybrid dynamic system of FIG. 3.
Figure 5:
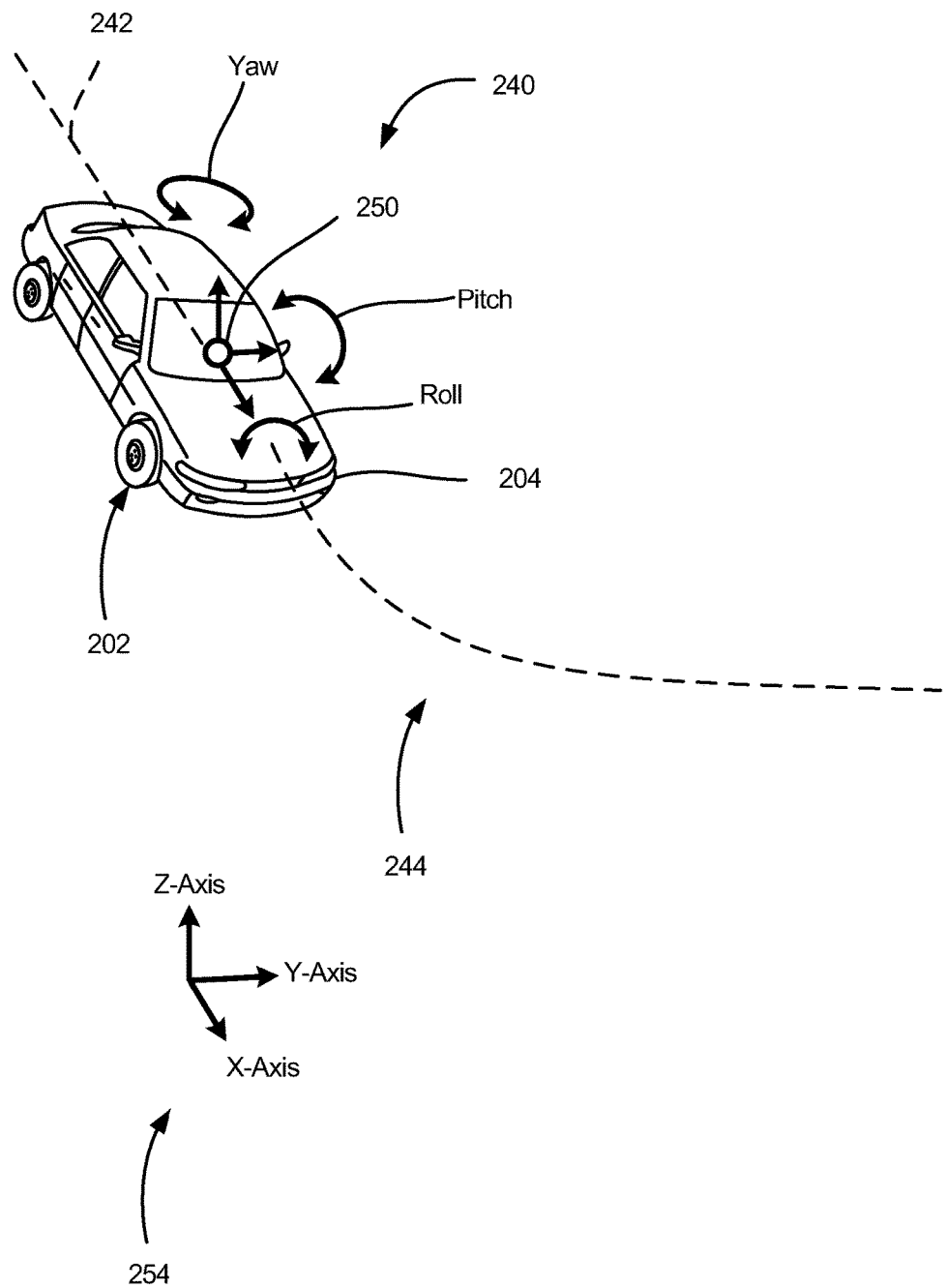
FIG. 5 is a pictorial representation of a vehicle moving along a path.

Referring also to FIG. 4, it should be noted the virtual model of the vehicle body 204 is a model of the center of gravity (CG) of the vehicle body in response to the coupling forces 212 as well as a virtual body guidance drive indicated at 230 in up to six degrees of freedom (DOF). The system 200 can be used to conduct tests on the actual physical components 208 as a virtual vehicle 240 (FIG. 5) comprising the virtual body model 204 and the DWT models 202 as it travels along a path 242 such as through a corner 244, if desired, on a road defined by digital road file 218.

For instance, and without limitation, the vehicle body 204 represented by CG 250 can be displaced in selected degrees of freedom such as those being only horizontal (in a plane comprising horizontal movements—X, Y positions relative to coordinate system 254 and yaw, rotational movements about a Z axis of the coordinate system 254). In yet a further embodiment, additional DOFs can be included, including all remaining DOFs besides the horizontal movements, in particular heave (linear movement parallel to the Z-axis), pitch (rotational movement about the Y-axis) and roll (rotational movement about the X-axis).

It should be noted that the vehicle body in system 200 is actually simulated as a decoupled body with constraints (e.g. forces acting) on it. As illustrated in FIG. 4, these constraints comprise the coupling forces 212 (the forces applied at the defined suspension attachment points) and virtual body guidance inputs (e.g. forces) in up to 6 DOFs represented at 230. Using an iterative process, a final drive 224 is obtained to generate coupling forces 212 that properly positions the virtual body over the modeled DWTs 202 as the simulated vehicle travels along the path 242 defined by the road data 218. With respect to FIG. 4, this means for the final iteration, the forces imposed by the virtual body guidance control 230 generate zero forces (or at least negligible forces in preferably all dimensions) on the virtual vehicle body. This can only result if the coupling forces 212 acting on the virtual body 204 (the forces applied at the defined suspension attachment points) that support the required body motion allows the body to follow the guidance control with zero or negligible applied forces at the guidance point (i.e. no or negligible external forces are needed to maintain the virtual body with respect to the DWTs).

For horizontal vehicle guidance (X, Y), the desired path 242 is known since it defines the simulation event, and adjusting it is not a solution. Rather, in order to minimize guidance forces 230 for horizontal vehicle guidance, the driver's inputs 272 are iteratively adjusted. The driver's inputs 272 include one or both of Steering Torque and Drive Torque, for example depending on simulation along a straight path or a path with curves or bends. Since steering also affects both Y and Yaw forces, adjustment of the Yaw guidance is also part of the iterative horizontal adjustment.

In contrast, the required guidance for Heave, Roll and Pitch (non-horizontal guidance) is not known so the control objective is to iteratively adjust the body guidance 230 to minimize the Heave, Roll, Pitch guidance forces in sympathy (corresponding agreement) with the suspension forces 212 coming from the fixed-body test system.

Figure 6A:
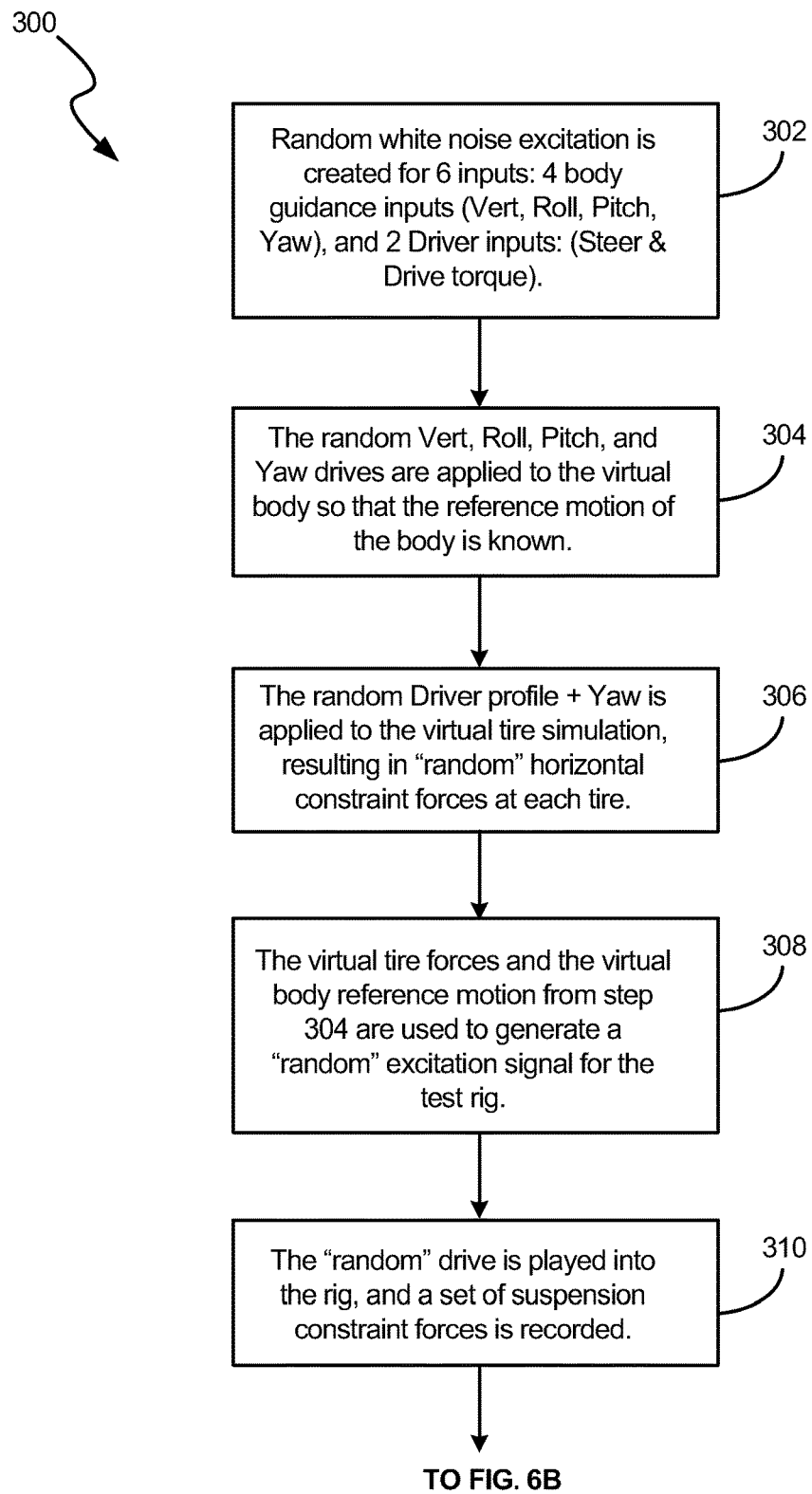
FIGS. 6A and 6B are a flowchart for obtaining the inverse model of a system dynamic response guidance model.
Figure 6B:
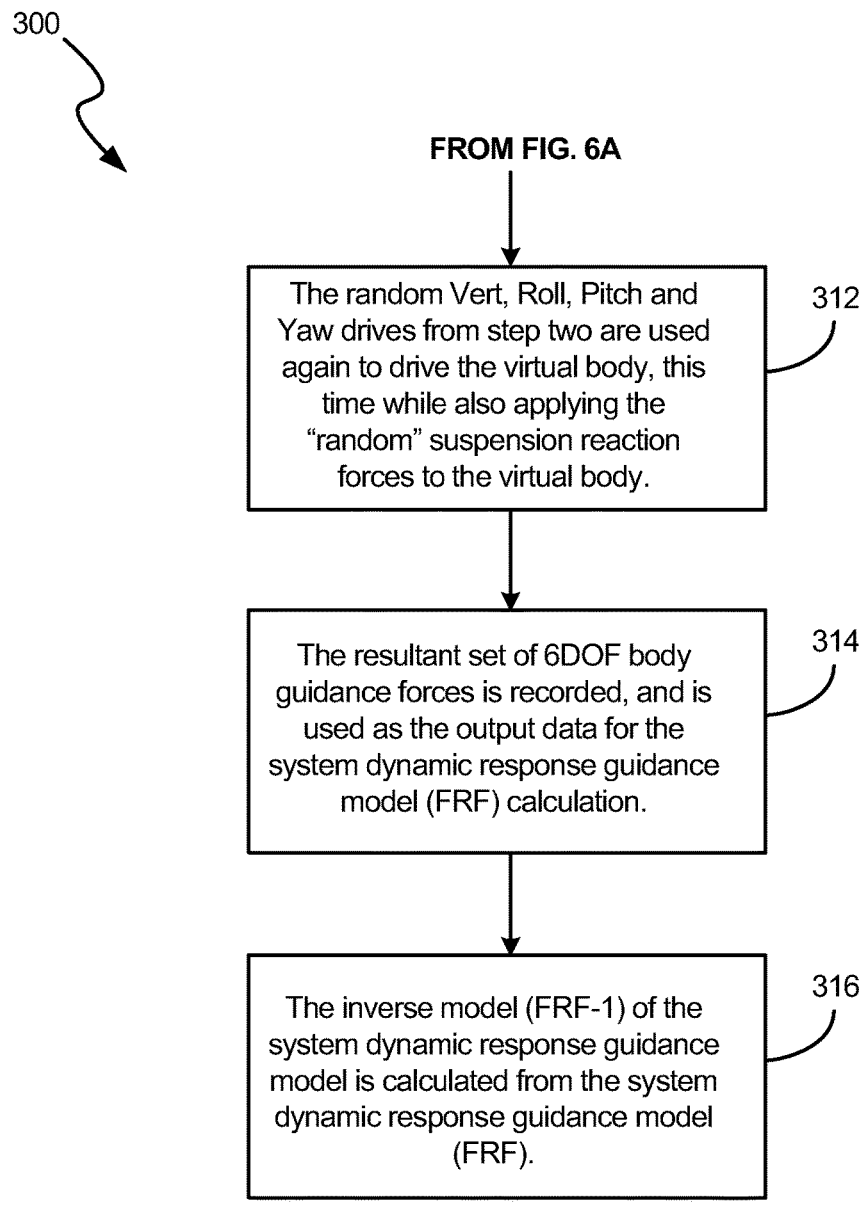

Iterative determination of drive 224 is illustrated in FIG. 4. Components of spindle convergence mode error are again identified at 220. The inverse (FRF$^{-1}$) 77' is ascertained in a manner similar to that described above. FIG. 4 also illustrates use of an inverse model (FRF$^{-1}$) 268 of the system dynamic response guidance model. A method 300 for obtaining the inverse model (FRF$^{-1}$) 268 of the system dynamic response guidance model is illustrated in FIGS. 6A and 6B. Generally, the inverse model (FRF$^{-1}$) 268 of the system dynamic response guidance model is obtained from first ascertaining a system dynamic response guidance model (FRF). In order to calculate the required guidance FRF model, random excitation in each guidance control is provided in order to obtain an associated Guidance Force Error.

Referring to method 300 at step 302, drives comprising random white noise excitation is created (herein by way of example) for 6 guidance control inputs: 4 virtual body guidance control inputs (Heave, Roll, Pitch, Yaw), and 2 guidance control inputs (Driver profile) corresponding to a driver of the vehicle (e.g. Steer Torque & Drive Torque). It should be noted for simpler motions of the vehicle body (e.g. straight line movements) less than 6 guidance controls may be acceptable.

At step 304, the random Heave, Roll, Pitch, and Yaw guidance control drive inputs are applied to the model of the virtual body 204 so that a reference motion of the virtual body is obtained.

At step 306, the random Driver profile (Steer Torque & Drive Torque) and Yaw are applied to each of the DWT virtual tire simulation models collectively represented at 202, resulting in "random" horizontal constraint forces at each tire. It should be noted "random" steer inputs are only applied to appropriately affected DWTs, for instance, typically the front two virtual tires on a front-steer vehicle, etc.

At step 308, the virtual tire forces ascertained by step 306 and the virtual body reference motion ascertained at step 304 are used to generate a "random" excitation drive signal for the test rig 206. To do this, the inverse spindle convergence (FRF$^{-1}$) 77' that was obtained using the method described above is used to create the test rig drive. It should be noted that the virtual body reference motion in pitch, roll, heave measured against the vertical DWT spindle motion response forms the expected corresponding suspension relative vertical displacement that needs to be applied to the fixed-reaction suspension in the rig along with the corresponding DWT virtual tire forces.

At step 310, the "random" drive is played into the test rig, and a set of suspension reaction constraint forces 212 is recorded.

At step 312, the random Heave, Roll, Pitch & Yaw drives from step 304 are used again to drive the virtual body model 204, this time while also applying the "random" suspension reaction forces 212 to the virtual body model 204.

At step 314, a resultant set of 6 DOF body guidance forces 266 is recorded, and is used as the output data for the system dynamic response guidance model (FRF) calculation based on the random 6 guidance control inputs: 4 virtual body guidance control inputs (Heave, Roll, Pitch, Yaw), and 2 Driver guidance control inputs: (Steer Torque & Drive Torque).

At step 316, inverse model (FRF$^{-1}$) 268 of the system dynamic response guidance model is calculated from system dynamic response guidance model (FRF).

During the iterative process and assuming that a virtual body guidance force error 266 exists, the error 266 is provided to the inverse (FRF$^{-1}$) 268 of the system dynamic response guidance model. From the virtual body guidance force error 266, the inverse (FRF$^{-1}$) 268 of the system dynamic response guidance model provides a guidance correction 270. Horizontal guidance corrections correspond to DWT wheel torque and steer corrections (steer angle and steering torque) corrections 271. These corrections are added to the DWT wheel torque and steer inputs of the current iteration 272 so as to generate values for a new iteration which are subsequently provided to the DWT virtual model 202 along with the other inputs from the digital road file 218, virtual body motion 216 and actual motion of each of the spindles 214. Upon reduction of the virtual guidance force error 266 to zero (or negligible virtual guidance force error) as well as, in this embodiment, reduction of spindle force errors to zero (or negligible spindle force errors) as measured by comparison of the actual and virtual forces of the spindles indicated by arrows 260 and 262, the final drive 224 is obtained with the requisite DWT wheel torque and steer angle inputs 272 now known given the digital road data 218 and the desired horizontal path 242 of the vehicle body defined by virtual body guidance 230. The final drive 224 can then be used for conducting a test.

At this point it should be noted that although illustrated with a single virtual body responding to the test rig when driven (e.g. coupling forces 212), this should not be considered limiting in that other coupled hybrid dynamic systems may have more than one virtual body responding to responses obtained from the physical components, other virtual bodies and/or other inputs from the system. Generation of the final drive is performed in a similar manner; however, motion of each virtual body would be accounted for in a similar manner as that described above with each virtual body having a corresponding inverse guidance (FRF$^{-1}$) with guidance error and guidance correction used iteratively. For example, another virtual body may respond to the same and/or other physical components, such as other physical components of the vehicle. By way of illustration only, in another embodiment actual engine mounts could also need to be tested along with the struts. In that embodiment, another portion (i.e. the engine) of the vehicle can be modeled in addition to the vehicle body. And/or in another embodiment, the system can have a model of a virtual body of a driver that interacts with the virtual vehicle body. And/or in yet another embodiment, the virtual vehicle body could also receive other modeled inputs (similar to modeled road 218) such as the how the wind can apply different loads, for example, when the vehicle is experiencing crosswinds.

Figure 7:
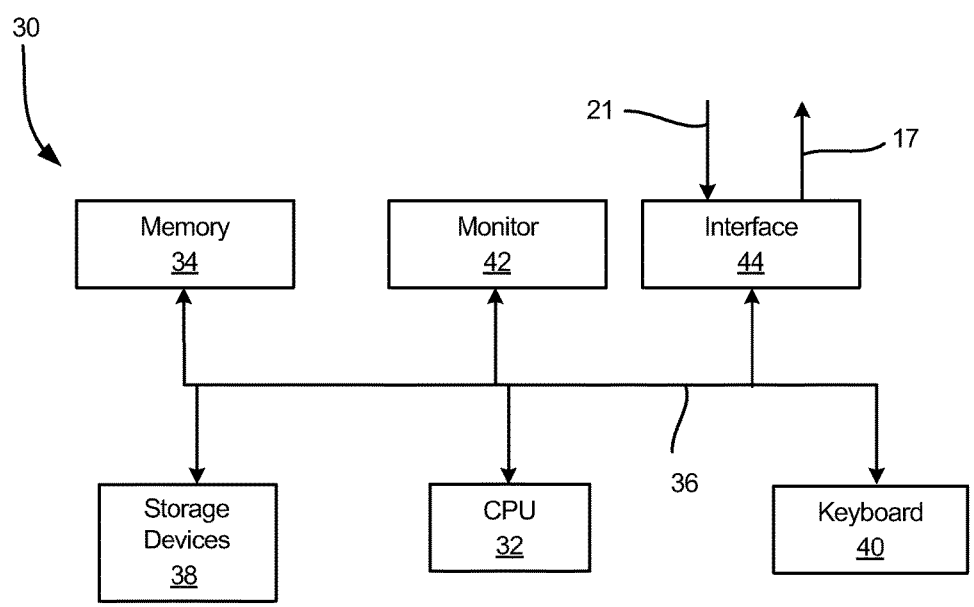
FIG. 7 is a schematic diagram of a suitable computing environment.

FIG. 7 and the related discussion provide a brief, general description of a suitable computing environment in which the invention may be implemented. Although not required, the rig controller as well as the computer performing the processing and storing the models herein will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 7 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Non-transitory computer readable storage devices 38, such as a hard disk, an optical disk drive, ROM, RAM, flash memory cards, digital video disks etc., are coupled to the system bus 36 and are used for storage of programs and data. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals are provided to the test system based on program modules executed by the computer 30 and through a suitable interface 44 coupling the computer 30 to the test system rigs. The interface 44 also receives the responses.

Although the foregoing system and method are particularly advantageous in the testing of vehicle components, it should be understood that this is but one embodiment and aspects of the present invention can be applied to other systems such as but not limited to airplane landing systems, train suspension systems, or other systems having a modeled first portion receiving inputs (e.g. forces at defined attachment points) from a physical component under test, wherein the physical component under test responds to a modeled second portion of the system, that in turn receives a first input comprising modeled test data, a second input being a response (e.g. motion of the modeled first portion) and a third input being a control mode from the physical component under test.

What is claimed is:

1. A test system for testing a coupled hybrid dynamic system corresponding to a vehicle in simulated motion along a virtual path, the test system comprising:
   a physical test rig with at least one actuator configured to test a physical structural component of the vehicle using the at least one actuator;
   memory storing:
      a first virtual model portion of the coupled hybrid dynamic system;
      a second virtual model portion of the coupled hybrid dynamic system,
         the first virtual model portion, the second virtual model portion and the physical structural component comprising the coupled hybrid dynamic system, and
         wherein the first virtual model portion includes a decoupled vehicle part with constraints acting on the decoupled vehicle part;
      data corresponding to a plurality of attachment points defining connections in the coupled hybrid dynamic system; and
   a processor coupled to the memory and the physical test rig and configured to derive a drive that when executed by the processor operates the at least one actuator of the physical test rig,
      the derived drive corresponding to the first virtual model portion, the second virtual model portion and the physical structural component virtually moving together along the path,
      the second virtual model portion receiving
         a first input comprising modeled test data,
         a second input being motion of the first virtual model portion of the coupled hybrid dynamic system, and
         a third input being a response from the physical test rig having the physical structural component under test and
      the first virtual model portion receiving
         a fourth input comprising guidance controls from a virtual guidance control, and a fifth input being a response from the physical structural component under test, wherein the derived drive obtained by iteratively applying test drives of the physical test rig until the virtual guidance control for the first virtual model portion is at least negligible when inputs into the first virtual model portion corresponding to the attachment points from a response of the physical test rig to the derived drive properly positions the first virtual model portion to move with the second virtual model portion along the path.

2. The test system of claim 1 wherein the processor is further configured to have guidance control inputs for the second virtual model portion corresponding to a driver of the vehicle.

3. The test system of claim 1 wherein the modeled test data comprises a road upon which the vehicle travels.

4. The test system of claim 1 wherein the guidance inputs for the second virtual model portion are iteratively corrected.

5. The test system of claim 1 wherein the inputs into the first virtual model portion corresponding to the attachment points comprise forces.

6. The test system of claim 1 the first virtual model portion comprises a body of the vehicle and the second virtual model portion comprises a plurality of tire and wheel assemblies.

* * * * *